United States Patent [19]
Thuerk et al.

[11] Patent Number: 5,284,720
[45] Date of Patent: Feb. 8, 1994

[54] VENT CAP WITH ELECTROLYTE DRAIN AND EXPLOSION ATTENUATION CAPABILITIES

[75] Inventors: David A. Thuerk, Brookfield; Debra L. Smith, West Allis; Thomas J. Dougherty, Waukesha; Randy K. Hulsebus, Plymouth, all of Wis.

[73] Assignee: Globe-Union Inc., Milwaukee, Wis.

[21] Appl. No.: 68,415

[22] Filed: May 27, 1993

[51] Int. Cl.⁵ .................................... H01M 2/12
[52] U.S. Cl. .................................... 429/87; 429/89
[58] Field of Search ...................... 429/82-84, 429/87-89, 72

[56] References Cited

U.S. PATENT DOCUMENTS

| | | |
|---|---|---|
| 2,452,066 | 10/1948 | Murphy . |
| 3,597,280 | 8/1971 | Hennen . |
| 3,630,788 | 12/1971 | Hennen . |
| 3,723,188 | 3/1973 | Hennen . |
| 3,846,178 | 11/1974 | Evjen et al. . |
| 3,879,227 | 4/1975 | Hennen . |
| 3,915,753 | 10/1975 | Melone . |
| 3,944,437 | 3/1976 | Auerbach . |
| 4,117,205 | 9/1978 | Kitai .................... 429/86 |
| 4,278,742 | 7/1981 | Oxenreider et al. ........... 429/88 |
| 4,394,423 | 7/1983 | Ledjeff .................... 429/86 |
| 4,447,508 | 5/1984 | Jensen .................... 429/57 |
| 4,463,069 | 7/1984 | Greenlee .................... 429/86 |
| 4,751,154 | 6/1988 | Binder et al. ............... 429/53 |
| 4,916,034 | 4/1990 | Hulsebus et al. ............ 429/86 |

Primary Examiner—Anthony Skapars
Attorney, Agent, or Firm—Foley & Lardner

[57] ABSTRACT

The explosion attenuating vent cap for storage batteries according to the present invention features an electrolyte drain and baffle design adapted for maximizing return to the battery of any liquid which may enter the vent from vibration, tilting, overheating, overcharge and the like. The vent barrel(s) include a step to assist in closure of the fill openings, and baffles within the vent prevent accumulation of electrolyte within the cap. The arrangement of the entrance to the gas escape passage (leading through an explosion attenuation device such as a disc of microporous polymer) is located on the center lines of the barrel and at the highest possible location within the vent to minimize the intrusion of electrolyte into the attenuation material. This location of the entrance prevents accumulation of electrolyte at that location. Preferably, the vent cap is of the ganged variety, i.e. useful for simultaneously capping three or more fill openings of the battery.

14 Claims, 3 Drawing Sheets

VENT CAP WITH ELECTROLYTE DRAIN AND EXPLOSION ATTENUATION CAPABILITIES

BACKGROUND OF THE INVENTION

1. Field of the Invention

The present invention relates generally to the art of electric storage batteries, for example sealed automotive batteries. More particularly, the invention relates to vent caps for such batteries which provide a flow path for the escape of hydrogen and oxygen formed during the electrochemical reactions which take place in such batteries. Still more specifically, the invention relates to a vent cap which also controls the flow of electrolyte which may enter the vent cap to ensure that it is returned to the battery cells and does not become entrained in the flow of gases passing through the cap or flow through the cap to the gas exhaust port.

2. Description of the Prior Art and Technical Problems

Conventional lead-acid batteries, such as those used for automobiles, generally include a number of cells disposed in a battery housing. Each cell typically includes a plurality of positive and negative battery plates or electrodes, and separators are sandwiched between the plates to prevent shorting and undesirable electron flow during the reactions which take place during manufacture and use of the batteries. The plates and separators are immersed in a liquid electrolyte in the cells, the most common being aqueous sulfuric acid. The positive plate generally is constructed of a lead-alloy grid covered with lead oxide, while the negative plate generally contains lead as the active material, again covering a lead alloy grid.

In most battery constructions the battery housing includes a box-like base containing the cells and is made from a moldable resin. The housing is generally rectangular in horizontal cross-section, the cells being provided by vertical partitions within the housing. A cover is provided for the casing, the cover includes level terminal bushings and a series of fill holes to allow electrolyte to be added to the cells and to permit whatever servicing is required during use of the batteries. To prevent undesirable spillage of electrolyte from the fill holes, most prior batteries have included some sort of filler hole cap. Battery electrolyte spillage can be caused by a number of factors, including vibration or tilting as the vehicle with which this battery is used maneuvers during normal use. Electrolyte escape may also be caused by battery overheating, a problem especially pronounced in recent years with smaller car engines, which tend to run hotter than prior engines.

The electromotive potential of each battery cell is determined by the chemical composition of the electroactive substrates employed in the electrochemical reactions. For lead-acid batteries, such as those described above, the potential is usually about two volts per cell, regardless of cell volume. Vehicles manufactured by original equipment manufactures (OEM's) typically require twelve volt batteries, so most of today's batteries include six cells (6 cells×2 volts per cell=12 volts). The size of the housing for the battery is selected for the "envelope" for a particular vehicle, i.e. the physical dimensions defined by the vehicle manufacturer for containment of the battery in the engine compartment.

In addition to preventing spillage of electrolyte from the cells, the battery cover design and the filler caps need to perform an important and different function. This is because gases are liberated from lead-acid batteries during the charge and discharge reactions. Such reactions start at the time the battery is originally charged (called "formation") by the manufacturer or by the retailer or vehicle manufacturer. They also occur during normal operating use of the battery. Factors such as high current charge and discharge conditions, and changes in temperature, can affect the rate at which gas evolution occurs. The gas generation and evolution issues in lead-acid battery construction are particularly important because the gases are hydrogen and oxygen and it is important to vent such gases in a controlled way from the battery to prevent pressure buildups in the housing which could lead to electrolyte leaks, housing failures, or most significantly explosions within the housing. It is also desirable, and well known, to prevent an external flame from entering the battery through gas exhaust ports.

As will soon become apparent, many prior art devices are known for venting gases from battery cells in a manner which allows diffusion of the potentially explosive hydrogen gas. It will also become apparent that prior attempts provide vent caps with a flame or spark blocking material, generally known as an explosion attenuation element. However, it will also be seen that the focus of such prior art caps is on gas venting and the exhaust thereof through an explosion attenuation media.

The two problems previously mentioned, i.e. electrolyte spillage and gas evolution, are really interrelated and equally important in the construction of an effective vent cap system. For example, electrolyte may enter the vent cap through several mechanisms. One mechanism is through vibrational or tilting spray of electrolyte into the cap, and another is through a mechanism frequently referred to as pumping. The latter occurs when gas evolved in the battery bubbles from the cells and carries or forces electrolyte out the fill hole and into the cap. When electrolyte enters the caps of prior designs it may be carried out the exhaust passageway to cause damage to external battery components such as the battery terminals or adjacent engine components.

Original equipment manufacturers are beginning to recognize the importance of the dual function performed by vent caps and have instituted a number of testing specifications designed to ensure electrolyte retention in the cells. One such test involves tilting a battery 35° about the longitudinal center line of the battery. This test is quite severe and could not be passed by a number of the prior art batteries using the vent constructions referred to below.

Early battery covers such as the "Gas Diffusion Device for Storage Batteries" described in U.S. Pat. No. 2,452,066, issued to Murphy on Oct. 26, 1948, used a diffusion member such as sheet asbestos or glass wool over the cells and supported by crossed grating bars. This simple design provided for gas diffusion, but not very effectively and it did not provide for practical electrolyte control.

In Hennen, U.S. Pat. No. 3,597,280, issued Aug. 3, 1971, a "Multiple Vent Plug Assembly" is described which includes three vent barrels entering three separate compartments, each of which is vented to the atmosphere. Circular baffles and other internal design features obstruct electrolyte from flowing to the vents.

In Hennen, U.S. Pat. No. 3,630,788, issued Dec. 28, 1971 entitled "Venting and Filling Device for Storage Batteries," a vent cap is described which uses an expandable funnel tube to permit filling of the cells with electrolyte, the lower end of the tube being immersed in the electrolyte. In this device, gases flow around the tube, through a tortuous path and through an expandable, porous diffusion material, such as a microporous material. If the gases are ignited outside of the microporous material, the cooling or heat dissipating effect of the microporous material will cause quick flame extinguishing and prevent flame propagation into the battery.

Evjen, et al. describe another system in U.S. Pat. No. 3,846,178, issued Nov. 5, 1974 and entitled "System for Absorption of Explosive Energy by Pressure Mitigation." In this system, a plurality of compressible, closed cell sheets are placed within the battery housing to keep the free space therein as small as possible. Since the volume of space within which explosive gases can accumulate is reduced, a large ratio of expansion is provided to maximize pressure reduction.

Another Hennen patent is U.S. Pat. No. 3,723,188 issued Mar. 27, 1973 for "Filling and Venting Device for a Storage Battery." In this device, a standpipe system ensures that electrolyte is maintained at a proper level in the cells. Gases percolate through a reservoir, forcing electrolyte to adjacent cells, and then are vented to the atmosphere through the hinged cap cover.

Another patent issued to the assignee of the present invention is Hennen's U.S. Pat. No. 3,879,227 entitled "Battery Vent Plug." This ganged plug features downwardly directed barrels for the fill holes and conical or sloping bottoms around drain opening which themselves include a slanted point to facilitate dripping of electrolyte into the cells. Gases follow a tortuous path through a porous diffuser adjacent the gas outlet. Semicircular baffles also surround each opening into the vent cap to facilitate directing electrolyte to the lowermost tip of the drain barrels. The gas pathway through the diffuser is upwardly. In one embodiment an open bottom tube is suspended from the top of the vent cap housing and depends downwardly over and is spaced above the cell vent opening.

Different explosion attenuation devices for single cells are disclosed in Melone, U.S. Pat. No. 3,915,753, issued Oct. 28, 1975 and entitled "Liquid Indicator for a Storage Battery with a Flame Barrier Vent Filter" and Auerbach, U.S. Pat. No. 3,944,437, issued Mar. 16, 1976 entitled "Explosion Proof Venting Device for Electrical Storage Batteries." Both provide tortuous flow paths for gases leaving the battery. The former additionally provides a liquid level indicator, while the latter provides a catalyst in the diffusion material to assist in the recombination of hydrogen and oxygen gases generated within the battery.

Another type of "Electric Storage Battery" is shown in Kitai, U.S. Pat. No. 4,117,205, issued Sep. 26, 1978. A gas cooling chamber separates electrolyte mist from discharged gas, the mist condensing to liquid electrolyte for return to the battery. Gases pass through a labyrinth flow chamber for being discharged through an air diffuser. The labyrinth also includes an electrolyte flow section.

Oxenreider, et al., in U.S. Pat. No. 4,278,742, issued Jul. 14, 1981 and entitled "Manifold Vented Battery Cover," also illustrates a battery cover employing a labyrinth design formed between two cover components which together form individual chambers for each battery cell, the chambers being interconnected by ports.

Another labyrinth system is disclosed in Ledjeff's U.S. Pat. No. 4,394,423, issued Jul. 19, 1983 and entitled "Closure Device for Lead-Acid Batteries." This device features an activated carbon gas diffusion system which in turn includes a wick for conducting condensed electrolyte back to the battery to replenish the liquid level.

A still further example of an explosion attenuation device is Jensen's U.S. Pat. No. 4,447,508, issued May 8, 1984 for "Reduced Maintenance Explosion Damage Resistant Storage Battery." A honeycomb material fills the space above the battery plates to subdivide the space into a plurality of small spaces and a sheet of catalytic recombination material is located above the honeycomb material to catalyze the reaction of any oxygen and hydrogen reaching that element.

In Greenlee, U.S. Pat. No. 4,463,069, issued Jul. 31, 1984 for "Battery Venting System", a porous flame arrestor is combined with an exhaust port, a combustion chamber and a buffer chamber between the combustion chamber and the arrestor. In Binder, et al., U.S. Pat. No. 4,751,154, issued Jun. 14, 1988 for "Battery Explosion Attenuation Material and Method", attenuation is provided by a porous compressible plastic material inserted in the head space of the battery.

Other explosion attenuation vent caps are described in commonly owned U.S. Pat. No. 4,916,034, issued Apr. 10, 1990 to Hulsebus, et al. and entitled "Battery Vent Strip." In this device, a vent cap includes a series of barrels with a strip extending transversely to the line of barrels, the strip including a porous explosion attenuation material. A plurality of channels couple the cells to the flame arrestor. Splash guards are provided to reduce electrolyte leakage into the exhaust flow path and the flame arresting material.

While a number of different solutions have been proposed in the aforementioned patents to the technical problems discussed earlier in this section of the specification, optimization has still not been achieved in one vent cap for the numerous problems with which the battery designer is faced—ensuring adequate electrolyte return, condensation, reducing electrolyte in the exhaust flow, pumping of electrolyte through the arrestor and tilting of the battery. All of these can result in electrolyte loss.

An improved vent cap for minimizing the possibility of electrolyte leakage from the battery, inhibiting the introduction of sparks or flame into the battery and efficiently directing gases from the battery is still needed. Such an improved vent cap would represent a substantial advance in this art.

SUMMARY OF THE INVENTION

The present invention provides a vent cap which includes a two piece construction adapted to facilitate electrolyte return to the battery, minimization of electrolyte entrainment of the exhaust flow path, distribution of electrolyte to a plurality of battery cells to maintain desirable electrolyte levels and an improved barrel construction minimizes the escape of gases or electrolyte around the barrel and into the space between the bottom of the vent cap and the battery cover.

The present invention also features a vent cap in which any electrolyte flow into the cap is redirected to the battery, while gases escaping from the battery are directed to a gas outlet through a simplified but effective gas flow path. These particular features are also accomplished in various battery orientations, including orientations in which the battery is tilted significantly about its longitudinal axis.

The present invention also features a vent cap having internal baffles constructed and arranged to prevent accumulation of pockets of electrolyte within the cap and an attenuation element entry port arranged and constructed to minimize intrusion of electrolyte.

How the present invention provides these features will become apparent from the following detailed description of the preferred embodiment, taken in conjunction with the FIGURES. Generally, however, they are accomplished by providing a vent cap having, in its most preferred form, a ganged arrangement for three battery vents and including molded thermoplastic top and bottom components which are joined by heat sealing. The lower component includes three aligned barrels to be inserted into the battery fill holes, each including a lower central aperture (and breather holes about the central aperture) and an external step surrounding the barrel to act as a more effective ring seal between the barrels and the fill holes. The barrels enter the cap through the floor of the lower component adjacent an edge thereof, which floor is constructed with an angle of incline so that any electrolyte entering the cap will flow toward the aligned and spaced apart barrel openings. Barriers are provided about the barrel openings, the barriers being constructed to prevent pockets of electrolyte from accumulating in the cap. The lower component also includes the bottom portion of the flame arrestor housing which itself includes an entry chamber. The upper component includes downwardly directed tubes or splash guards having open bottoms and being arranged to be coaxial with but spaced slightly above the barrel openings when the upper and lower components are assembled. The upper component also includes the upper portion of the flame arrestor housing including a cup for receiving the preferred microporous material, and the entry chamber. The latter is open to provide a pathway for the escape of gas through the arrestor and out an exhaust port provided in the upper component. The opening to the arrestor housing is optimally located in the upper half of the vent cap and above the center line of the barrel openings.

Other ways in which the vent cap of the present invention, or modifications thereof, provide the features mentioned above, and other improvements over the prior art, will become apparent to those skilled in the art after reading the balance of the specification and after reviewing the drawings. Such other ways and modifications are deemed to be within the scope of the present invention if they fall within the scope of the claims appended hereto.

BRIEF DESCRIPTION OF THE DRAWINGS

In the various FIGURES, like reference numerals are used to indicate like components.

DETAILED DESCRIPTION OF THE PREFERRED EMBODIMENT

Before proceeding to a detailed description of the preferred embodiment, several general comments are warranted concerning the scope and applicability of the present invention.

First, a three fill hole ganged arrangement is illustrated, an arrangement which is fairly typical of vent caps used in a number of current battery designs, such as those used for 12-volt automobile batteries. Ganged caps having less or more barrels per cap are encompassed by the present invention and could be readily constructed and designed by those skilled in the art after reading this specification.

Second, the preferred material for constructing the illustrated vent caps is polypropylene copolymer with about 5-20 wt. % polyethylene, but other thermoplastic, moldable resins can be used. In fact, thermoset resins could also be used if a technique other than heat sealing is employed to join the several cap components. One such technique would be the use of adhesives. The main criteria for the cap components, as well as for the explosion attenuation material, are that they be able to withstand the harsh environment encountered in lead-acid battery systems, including cold and elevated temperatures and the acidic environment generated by the battery electrolyte.

Third, the dimensional relationships are for illustrative purposes and could vary widely with different types of batteries. For example, the length of the barrels, as well as the width, length and height of the cap, can be varied without departing from the invention's intended scope.

Fourth, the improved vent cap of the present invention includes several novel features which, when combined, lead to the most preferred embodiment. However, several of these features could be employed individually or in subcombinations to achieve specific needs for a particular battery design.

Figure 1A:
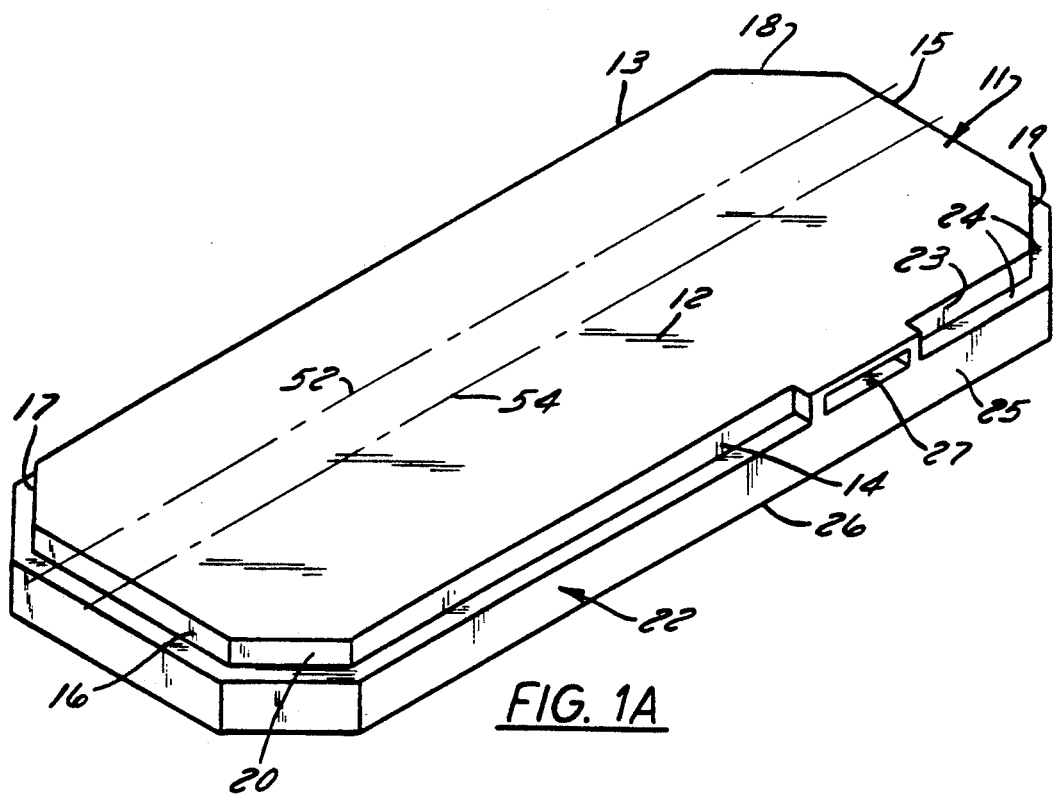
FIG. 1A is a top perspective view of the top component of a vent cap according to the most preferred form of the invention.
Figure 1B:
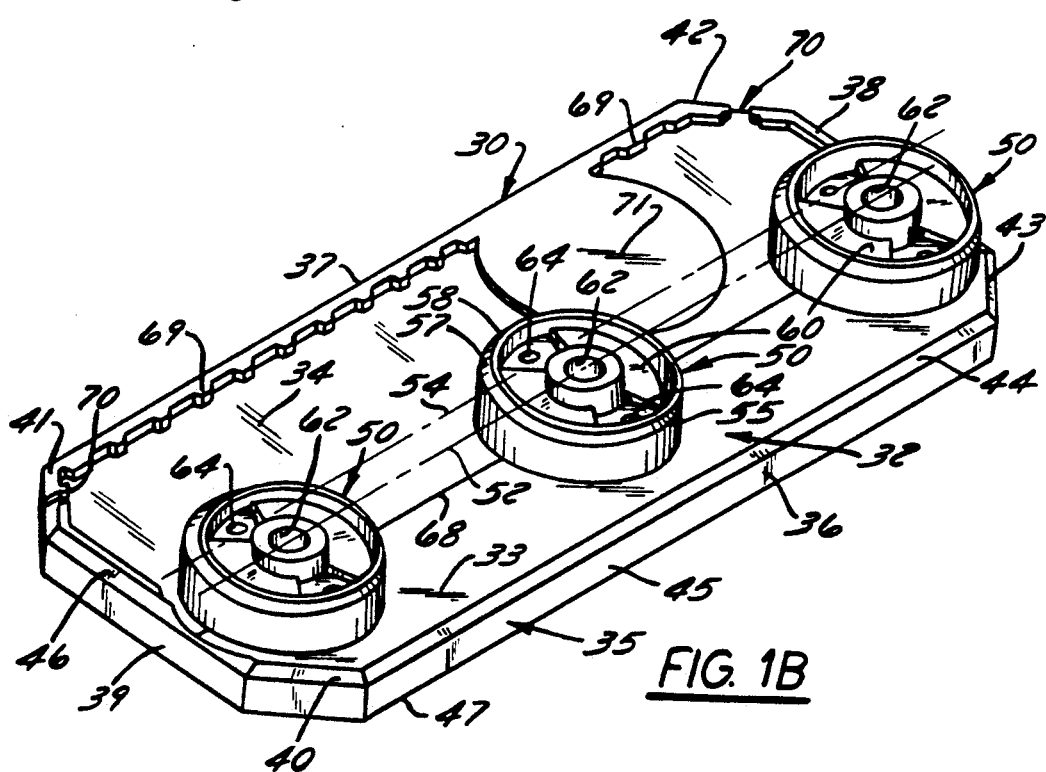
FIG. 1B is a bottom perspective view of the bottom component of the vent cap.

Proceeding now to the detailed description, attention should first be directed to FIGS. 1A and 1B showing in perspective form the exterior of the top and bottom components of a vent cap. The cap includes a top 11 having a planar top portion 12 including eight edges. They include longer sides 13-14, shorter ends 15-16 and four corner edges 17-20. The use of corners 17-20, rather than simply using a rectangular cap, as was typical with prior cap designs, is preferred because of the unique aesthetic appeal. Other advantages include reduced use of material and the elimination of sharper corners within the cap which could trap droplets of electrolyte.

Top 11 also includes a stepped depending skirt 22 including a first vertical component 23 leading to a horizontal ledge 24 (which is generally coplanar with top portion 12 and a second vertical component 25 located outwardly of vertical component 23). Again, this step arrangement is primarily for design considerations. Skirt 22 also includes a bottom 26.

The final feature of top 11 illustrated in FIG. 1A is an exhaust port 27 located along side 14 and extending through vertical component 23 of the skirt 22. The precise location of the port is not critical, but it is preferred that it be located between two barrel locations as will become more apparent as the description continues.

FIG. 1B illustrates in perspective form the bottom component 30 of the cap. It includes a floor 32 comprised of two sections, a planar section 33 and an inclined section 34. Bottom 30 also includes an upwardly (when in the use position) extending and surrounding skirt 35 having eight sections, all arranged to fit within skirt 22 of top 11. The floor 32 includes sides 36 and 37 (to fit within sides 13 and 14 of top 11), ends 38–39 (to fit within ends 15 and 16, respectively), and corners 40–43. The skirt 35 includes an outwardly and upwardly extending section 44 and a section 45 extending perpendicularly to floor 32. Skirt 35 also includes a top 47 (actually shown at the bottom of FIG. 1B which shows bottom 30 in a position which is inverted from its normal position). When assembled, top 11 and bottom 30 are in a nesting configuration with skirt 35 adjacent skirt 22. It can also be pointed out here that the two major components of the cap are eventually joined to one another, such as by heat sealing top edge 47 of the bottom 30 to an interior adjoining ledge of top 11, shown in detail in FIG. 3.

As mentioned previously, top 11 and bottom 30 are molded from a thermoplastic resin, such as polypropylene containing a lesser amount of polyethylene. The sealing of the two components can take place using heated platens, ultrasonic welding, or other techniques known in the art for joining such materials.

Continuing now with the description of FIG. 1B, three barrels 50 are shown extending downwardly from floor 32. Barrels 50 are arranged in a linear, spaced-apart relationship, the center of the barrels lying along a line 52 spaced apart from the longitudinal center line 54 of bottom 30. Both lines are represented by dashed lines shown in FIGS. 1A and 1B.

Barrels 50 include a generally cylindrical tubular portion 55 having an inwardly tapered surface 57 at the end thereof opposite floor 32, terminating in a lip 58. A closure 60 is also provided for barrels 50 including a central aperture 62 and, in the preferred embodiment, a pair of breather holes 64 located intermediate aperture 62 and tubular portion 55. The apertures 62 and breather holes 64 will permit electrolyte and gases to enter or leave the cap when it is assembled and the barrels are placed in the fill holes of the battery. The breather holes also facilitate return of electrolyte to the battery cells despite any continuing flow of gas which may be exiting a particular cell.

As mentioned previously, floor 32 includes two portions 33 and 34. Portion 33 extends along side 36 and extends inwardly to the imaginary line 52 extending through the axis of the barrels 50. Floor 32 then rises (again referring to the use rather than the inverted illustrated position) along section 34 to side 37. The incline in the most preferred embodiment is 4.5°, but could be in a broader preferred range of about 3°–6° or an even broader range of about 1°–16°. The incline is illustrated best at side 37, where the drop from the lower portion of side 37 and its junction with the floor is illustrated at 68. It can also be noted along side 37 and corners 41 and 42 that the mold used for bottom 30 provides a plurality of support ribs 69, primarily for purposes of preventing bowing of this part of bottom 30. Openings 70 in corners 41 and 42 permit any gases which may accumulate beneath the cap, i.e. between bottom 30 and the battery cover, to be readily and safely dispersed.

The final feature of bottom 30 shown in FIG. 1B is a circular area 71 which is the floor for the flame arrestor housing to be described later in this specification. It is generally coplanar with section 33 of floor 32, and its construction will best be understood by reference to FIG. 2.

Figure 4:
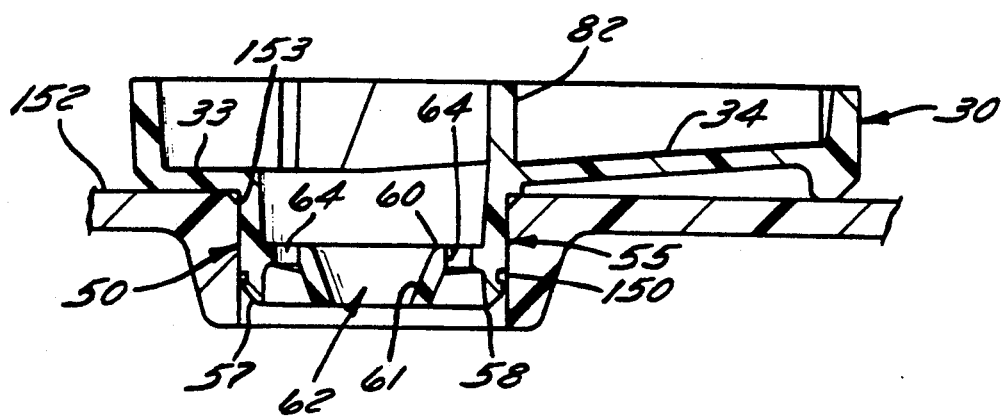
FIG. 4 is a transverse cross-section of the bottom of the vent cap of FIGS. 1A and 1B taken through one of the barrels to illustrate the inclined floor and the barrel step.

A feature of the bottom 30 not shown in FIG. 1B is a small step on barrel tubular portion 55, a feature which would be difficult to illustrate in this perspective view and which will be illustrated in detail in FIG. 4. Suffice it now to say that tubular portions 55 are manufacture to ensure a friction fit within the battery fill holes previously mentioned, the tapered sections 57 facilitating insertion of the barrels into the fill holes.

Figure 2:
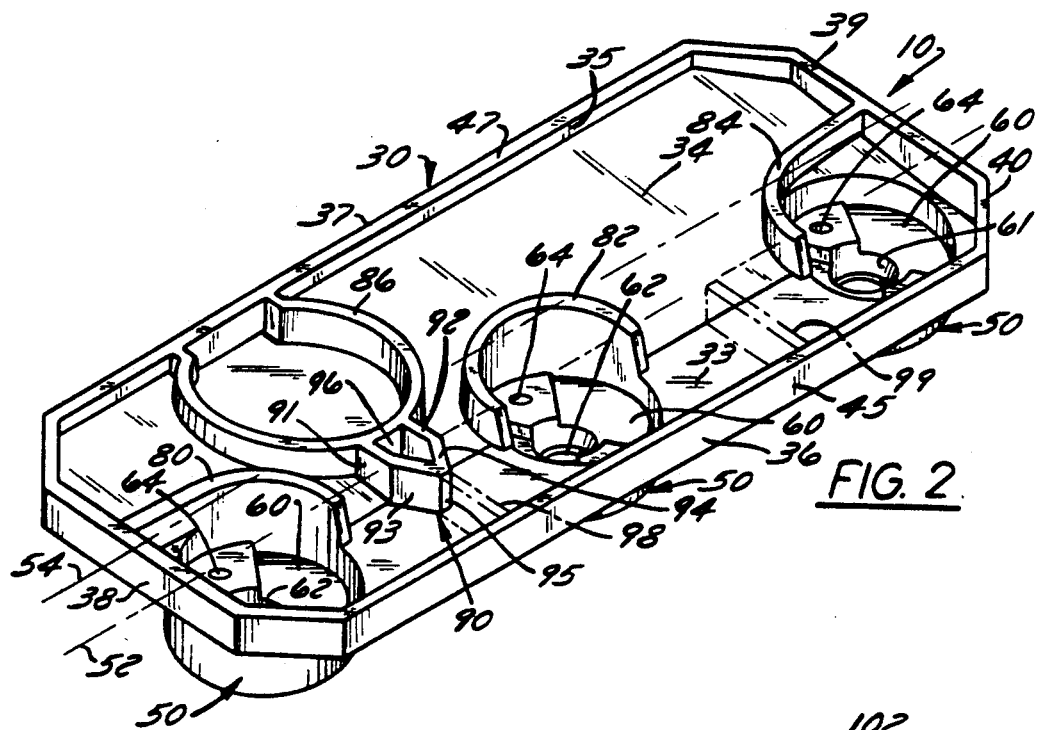
FIG. 2 is a perspective view of the interior of the lower component of the vent cap shown in FIG. 1B.

Referring next to FIG. 2, the interior of bottom 30 is illustrated. This FIGURE shows the bottom in its normal use position, i.e. with the barrels extending downwardly. The inclined portion 34 of floor 32 is discernable in this view by noticing the interior height of the side 37 compared to the height of the corner 40 and end 39. The barrel center line 52 and the cap center line 54 are also illustrated here.

From a closer examination of the interior of the barrel closures 60, it will be noted that they include downwardly inclined conical interior surfaces 61 leading to the apertures 62. The breather holes 64 are also visible in this FIGURE.

New features illustrated in FIG. 2 include certain baffles and flame arrestor housing components which will be individually described. Proceeding from left to right in the FIGURE, three baffles 80, 82 and 84 are provided, one for each of the barrels 50. The end baffles are similar and include a barrier wall extending from the barrel center line 52 and a location adjacent the innermost part of the barrels and extending in a generally arcuate manner around the associated barrel and terminating at ends 38 and 39, respectively. Baffle 82, on the other hand, is semicircular, surrounding one half of the center barrel 50 and arranged so that the midpoint of the semi-circle is along the cap center line 54.

From the perspective view, it therefore becomes apparent that any electrolyte which may enter the cap and which may escape the partial confinements provided by baffles 80, 82 and 84 will reside on floor portions 33 and 34. If on the latter, it will drain to portion 33 for distribution to the three apertures 62. The arrangement of the baffles prevents any droplets of electrolyte from accumulation in any area of bottom 30, and the planar portion 33 of the floor 32 will provide distribution of electrolyte to the various cells, as the area is unobstructed by internal components so commonly found in prior art devices.

The flame arrestor housing components of bottom 30 include a generally circular wall 86 extending from side 37, the circle being flattened in the area of this side. A five sided dam component 90 is coupled to the portion of wall 86 furthest from side 37 and defined by a pair of parallel and spaced apart walls 91 and 92 having first ends coupled to circular wall 86 and second ends. The latter begin a pair of converging walls 93 and 94 which come together at a blunt point 95. A pentagonally shaped recess 96 is formed by these walls, with point 95 being located between the barrel center line 52 and side 36. Substantial clearance between point 95 and side 36 is desired so electrolyte can be distributed along floor section 33, as previously described.

Finally, in connection with FIG. 2 it should be noted that the top 47 is generally coplanar with the tops of barriers 80, 82 and 84 as well as walls 86 and 91-94. This feature will permit joining of all those surfaces to mating surfaces of top 11 now to be described.

In an alternate embodiment of the present invention shown in FIG. 2, a pair of short walls 98, 99 may be provided in the cap (they are shown in phantom), one extending from portion 94 of the dam component 90 and extending perpendicularly to side 36. The other is located between baffles 82 and 84 and extends from wall 36 to the line dividing the inclined portion 34 from flat portion 33 of the floor 32. Such walls may be advantageous in reducing splashing in batteries designed for use with vehicles which may be especially prone to jarring, excessive tilting and the like.

Figure 3:
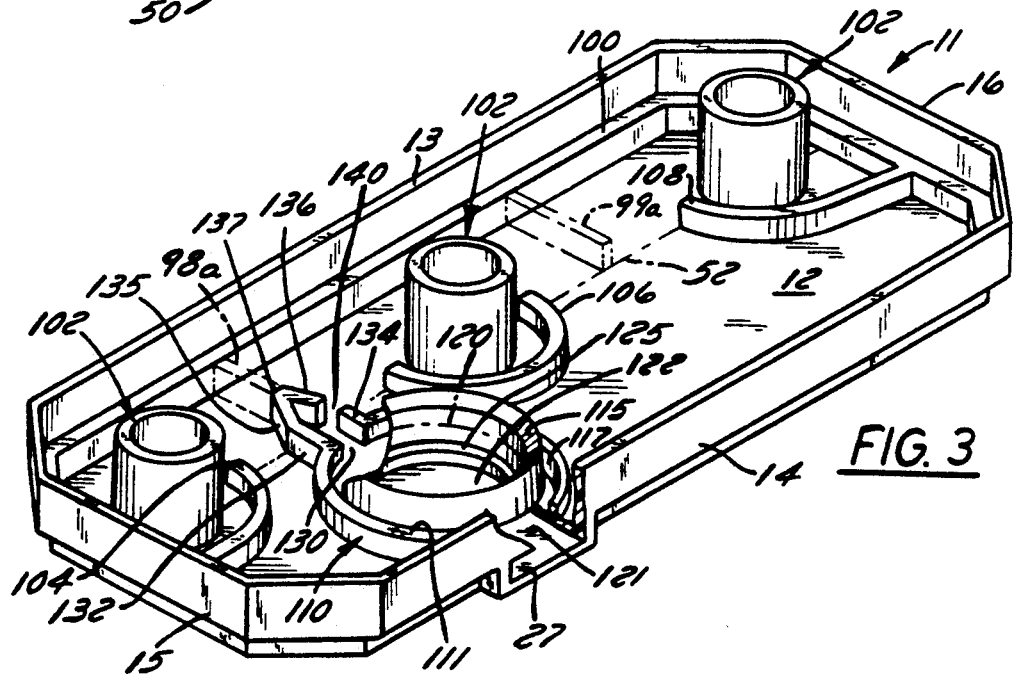
FIG. 3 is a perspective view of the interior of the top component of the vent cap shown in FIG. 1A, the top component being inverted from its use position for ease of explanation.

The interior of top 11 is shown in perspective form in FIG. 3, and it should be indicated at the outset that the illustration shows top 11 in a position inverted from the "use" position. It is necessary to do so to illustrate and describe the components, and the reader should keep this orientation in mind, as such terms as "upper" and "lower" will be used in the context of the "use" position, as opposed to the illustrated position.

In FIG. 3, a heat seal pad 100 is shown surrounding the interior of top 11, adjacent the sides, ends, and corners, and functions to provide a sealing surface for the top 47 of the bottom 30. Other prominent features of top 11 are three tubular splash guards 102 extending perpendicularly from top portion 12. They are open and are of a length selected so that the open ends are spaced slightly above apertures 62, the barrels 50 and the splash guards 102 being generally coaxial. The splash guards in and of themselves are not unique, and similar structures are shown in some of the prior art patents mentioned above.

Top 11 also includes barriers 104, 106 and 108, shaped and arranged generally to mate with and be sealed to barriers 80, 82 and 84. The splash guards 102 and the combined barriers will form walls extending between the top 11 and the floor 32 of bottom 30, acting to effectively prevent splashing of electrolyte entering the cap from apertures 62 or holes 64 beyond the containment they provide. The structure permits, however, unobstructed flow paths from the barrels 50 to the cap interior between apertures 62 and guards 102 and around the combined barriers.

Top 11 also includes flame arrestor housing components including an outer circular wall 110 having an upper surface 111 adapted to engage and be sealed to wall 86 of bottom 30. An inner and taller ring 115 is concentrically arranged and spaced apart within wall 110, designed and constructed to contain a disc 120 (shown in phantom) of flame arrestor material. The disc in the most preferred embodiment is made from a microporous sintered polypropylene material, as has been described in earlier patents owned by the assignee of this invention. An annular passageway 117 is thus provided between walls 110 and 115. That passageway is enclosed by a surface 121 forming the upper boundary of the exhaust port 27. In other words, the port 27 communicates only with the upper portion 122 of disc containing ring 115. A ledge 125 depends from the top portion 12 to provide the circular upper portion above the disc 120.

Entry of gases into passageway 117 is facilitated by a dam entrance located above and designed to be sealed to walls 91-94 of bottom 30. Wall 110 is open at 130 in this instance, however, as opposed to being uninterrupted as in bottom 30. Extending from one edge of opening 130 is a wall 132 transverse to the longitudinal axis of the cap. A shorter wall 134, parallel to wall 132, extends from the opposite side of the opening 130. A point is provided on the dam entrance by a pair of converging walls 135 and 136, meeting at point 137. Wall 137 is shorter than Wall 135, thereby forming, with shorter wall 134, an opening 140 into the pentagonally shaped entrance area.

The location of entrance 140 is an important feature of the present invention, namely near, and most preferably directly above, the barrel center line previously discussed. It could vary from either side of the line by an amount preferably no greater than the radius of the barrel openings. It is also located at the highest possible location within the cap, thereby minimizing the intrusion of liquid electrolyte into the flame arrestor. It should also be recognized that the opening 140, being located on a slanted side of the dam, allows any electrolyte which may enter the cap to easily "slide" off walls 136 and 94, rather than entering the opening 140. Gases, however, which enter opening 140 are free to flow into the area defined by the pentagonally shaped cavities, into passageway 117 and downwardly to the bottom of the flame arrestor disc 120 adjacent bottom 30. From there, the gases penetrate the microporous disc 120, enter circular open portion 122, and are exhausted beneath flat 121 to the exhaust port 27.

While the dam arrangement illustrated is preferred, baffling systems could be employed, as long as they achieve the result of directing the exhaust gases to the highest point in the cap for entry into the arrestor containment system.

As mentioned previously, another feature of the present invention is the provision of a small but important steps 150 on the exterior of the tubular walls 55 of barrels 50. They can best be seen in FIG. 4 and are located just below the level of the breather holes 64. In one especially preferred example, the barrels have an outer diameter of $0.598 \pm 0.003''$ above the breather holes 64, while the step reduces the outer diameter to $0.588 \pm 0.003.''$ The drawing is exaggerated to show the step 150. While quite small, the square corner of the step 150 greatly assists in preventing electrolyte or gases from escaping around the barrels 50 and entering the space between the battery cover and the cap. A portion of the battery cover 152 is shown in this FIGURE, along with the one fill hole 153.

Considerable testing has been conducted using the vent cap of the present invention, comparing it to competitive battery vent caps currently in use. The Subaru vibration spewing test is conducted with vibration and while tilting the batteries 30°. The vent caps of the invention performed up to this requirement and exceeded it at 35° tilt. When compared to competitive caps, the vent cap of the present invention was the only cap to achieve 100% passage at 30° tilt and nearly a 90% passage rate at 35°. The competitive caps performed much more poorly, with only about 65% passage at 35° for the best of the competitive caps tested. Some of the current caps tested had only nominal (i.e., less than 10%) passage during the 35° test.

While the present invention has been described in connection with a preferred and illustrated embodiment, it is not to be limited thereby, but is to be limited solely by the scope of the claims which follow.

What is claimed is:

1. A vent cap for a battery of the type which includes a battery cover having electrolyte fill holes and electrolyte which may, during use, spew, spill, evolve or be pumped from the fill holes, the cap comprising:

a chamber having a floor and plural barrels arranged linearly and extending from the floor and arranged to be inserted into the fill holes, the floor having a generally planar portion from which the barrels extend and an inclined portion arranged to facilitate drainage of any electrolyte entering the chamber to the planar portion; and the chamber including a flame arrestor having an entrance for gases which may enter the chamber through the barrels and an exhaust port, the entrance being located generally above a line extending through the centerline of the barrel openings.

2. The vent cap of claim 1, further including splash guards within the chamber for the barrels.

3. The vent cap of claim 2, wherein the chamber includes a top, and tubular splash guards depend from the top and are coaxially arranged over the barrels and spaced above the chamber floor.

4. The vent cap of claim 2, wherein the chamber includes a plurality of interior walls extending from the top to the floor, the walls each surrounding a portion of the openings of the barrels into the chamber floor.

5. The vent cap of claim 4 wherein baffles are provided between barrels to assist in directing electrolyte to the fill holes.

6. The vent cap of claim 5, wherein the flame arrestor entrance is located adjacent the top of the chamber.

7. The vent cap of claim 1, wherein the vent cap includes a plurality of spaced-apart barrels arranged in a line, the cap is generally rectangular in horizontal cross-section, the planar portion being located along one long side of the rectangle and the inclined portion being located adjacent the other long side of the rectangle, the vent cap including interior splash guards for the barrels, a chamber top and a flame arrestor located at the top of the chamber, the arrestor being contained in a housing having an entrance at the top of the chamber and located above a line extending through the centerline of the barrel openings.

8. The vent cap of claim 7, wherein the barrels each include a first cylindrical portion adjacent the cap floor having a first outside diameter and a second cylindrical portion remote from the cap floor and having a second smaller outside diameter.

9. A vent cap for a battery of the type which includes generally cylindrical fill holes in a battery cover, the battery including liquid electrolyte and the vent cap being designed to return to the battery any electrolyte which might be splashed, spilled, spewed or pumped from the fill holes and to permit the discharge of gases which might be evolved from the battery through the vent cap and out an exhaust port, the vent cap comprising:

a chamber having a plurality of generally cylindrical barrels extending therefrom and having an outer diameter chosen for an interference fit with the battery fill holes; and means on the barrels for reducing the likelihood that gases or electrolyte can escape the battery in the area between the outside barrel wall and the inside wall of the fill hole, the reducing means comprising a step in the barrel wall wherein the outside diameter of the barrel is reduced.

10. The vent cap of claim 9, wherein the step is abruptly created by a radially extending 90° step.

11. The vent cap of claim 9, wherein the amount of reduced diameter for the barrel is about 0.003-0.025 inches.

12. A vent cap for a battery of the type containing fill holes in a battery cover, liquid electrolyte, the vent cap being designed to return to the battery any electrolyte which might be spewed, pumped or poured from the fill holes and to permit the discharge of gases which might be evolved from the battery through the vent cap and out an exhaust port provided in the vent cap, the vent cap comprising:

a chamber having a top and a floor, a plurality of barrels extending through the floor and into the fill holes of the battery, the barrels being spaced apart and arranged in a line;

the exhaust port for the vent cap being located at the top of the chamber;

a flame arrestor contained within a chamber having an entrance at the top of the chamber, a gas flow path directing gases entering the chamber through the flame arrestor, and an outlet at the top of the chamber coupled to the exhaust port.

13. The vent cap of claim 12, wherein the chamber entrance is located above the center line of the barrels.

14. The vent cap of claim 12, wherein the chamber includes a dam area into which the entrance is formed, the dam area having a wall section extending between the top and floor of the chamber and angled at an acute angle with respect to the longitudinal axis of the vent cap, the entrance being provided in an upper portion of the wall section.

* * * * *